United States Patent
Ju et al.

(10) Patent No.: US 11,269,895 B2
(45) Date of Patent: Mar. 8, 2022

(54) AUTOMATED LABELING OF CHILD OBJECTS WITHIN TAGGED PARENTS

(71) Applicant: Microsoft Technology Licensing, LLC, Redmond, WA (US)

(72) Inventors: Yun-Cheng Ju, Bellevue, WA (US); Ashwarya Poddar, Kirkland, WA (US); Yu Zhang, Sammamish, WA (US); Lei Lu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 16/563,816

(22) Filed: Sep. 6, 2019

(65) Prior Publication Data
US 2021/0073236 A1 Mar. 11, 2021

(51) Int. Cl.
| | | |
|---|---|---|
| *G06F 16/30* | (2019.01) | |
| *G06F 16/2457* | (2019.01) | |
| *G06F 16/28* | (2019.01) | |
| *G06N 20/00* | (2019.01) | |
| *G06F 16/248* | (2019.01) | |
| *G06N 5/04* | (2006.01) | |

(52) U.S. Cl.
CPC ...... *G06F 16/24578* (2019.01); *G06F 16/248* (2019.01); *G06F 16/285* (2019.01); *G06N 5/04* (2013.01); *G06N 20/00* (2019.01)

(58) Field of Classification Search
CPC ............. G06F 16/24578; G06F 16/285; G06F 16/248; G06F 16/2423; G06F 16/3334
USPC ........ 707/609, 687, 705, 769, 790, 813, 821
See application file for complete search history.

(56) References Cited

U.S. PATENT DOCUMENTS

| | | |
|---|---|---|
| 6,697,998 B1 | 2/2004 | Damerau et al. |
| 9,082,047 B2 | 7/2015 | Marchesotti |
| 9,355,337 B2 | 5/2016 | McAuley et al. |
| 9,965,704 B2 | 5/2018 | Zhou et al. |

(Continued)

FOREIGN PATENT DOCUMENTS

WO 2007100848 A2 9/2007

OTHER PUBLICATIONS

"International Search Report and Written Opinion Issued in PCT Application No. PCT/US20/038010", dated Oct. 21, 2020, 13 Pages.

(Continued)

*Primary Examiner* — Sana A Al-Hashemi

(57) ABSTRACT

Solutions for automated labeling of child objects within tagged parents include: receiving a plurality of parent objects, each having a tag and including a plurality of child objects; receiving a machine learning (ML) component operable to rank the parent objects; for each parent object: generating a set of restricted objects, wherein each restricted object is missing a child object; for each of a plurality of queries, ranking, with the ML component, the restricted objects according to relevance; based at least on the query and an inverse of the rank of the restricted objects, assigning a child object label. In some examples, the object missing from the restricted object having the lowest relevance rank is assigned a label based on the query. Various advantageous uses of the assigned child labels include enhancing search result reporting, automatically generating ML training data, and automatically generating and/or modifying reports.

20 Claims, 13 Drawing Sheets

(56) References Cited

U.S. PATENT DOCUMENTS

| | | | | |
|---|---|---|---|---|
| 2011/0313548 | A1* | 12/2011 | Taylor | G06F 16/9024 |
| | | | | 700/47 |
| 2016/0179945 | A1* | 6/2016 | Lastra Diaz | G06F 16/3334 |
| | | | | 707/739 |
| 2017/0329845 | A1* | 11/2017 | Epstein | G06F 16/335 |
| 2017/0345075 | A1* | 11/2017 | Khandelwal | G06Q 30/0623 |
| 2019/0109809 | A1* | 4/2019 | Wang | G06F 16/248 |
| 2019/0361934 | A1* | 11/2019 | Rogynskyy | G06F 16/122 |

OTHER PUBLICATIONS

"Topic Analysis", Retrieved from: https://web.archive.org/web/20190503131646/https:/monkeylearn.com/topic-analysis/. May 3, 2019, 63 Pages.

Alaudah, et al., "Learning to Label Seismic Structures with Deconvolution Networks and Weak Labels", In SEG Technical Program Expanded Abstracts, Aug. 27, 2018, 6 Pages.

Arras, et al., "What is Relevant in a Text Document?: An Interpretable Machine Learning Approach", In Journal of PloS one, vol. 12, Issue 8, Aug. 11, 2017, 13 Pages.

Brodley, et al., "Identifying Mislabeled Training Data", In Journal of Artificial Intelligence Research, vol. 11, Aug. 1, 1999, pp. 131-167.

Gupta, Shashank, "Automated Text Classification Using Machine Learning", Retrived from: https://towardsdatascience.com/automated-text-classification-using-machine-learning-3df4f4f9570b, Jan. 11, 2018, 7 Pages.

Kachkach, Ahmed, "Problem-solving with ML: automatic document classification", Retrieved from: https://cloud.google.com/blog/products/gcp/problem-solving-with-ml-automatic-document-classification, Jan. 10, 2018, 13 Pages.

* cited by examiner

| EXAMPLE TRIGGER QUERIES | Show me our sales pipeline<br>Show me our pipeline<br>What does our sales pipeline look like<br>Sales pipeline<br>Pipeline<br>Pipeline summary<br>Deal summary<br>Show me the pipeline for new customers<br>How many open opportunities do we have<br>How much open revenue do we have | 202 |
|---|---|---|
| REPORT NAME | Sales Pipeline Summary | 204 |

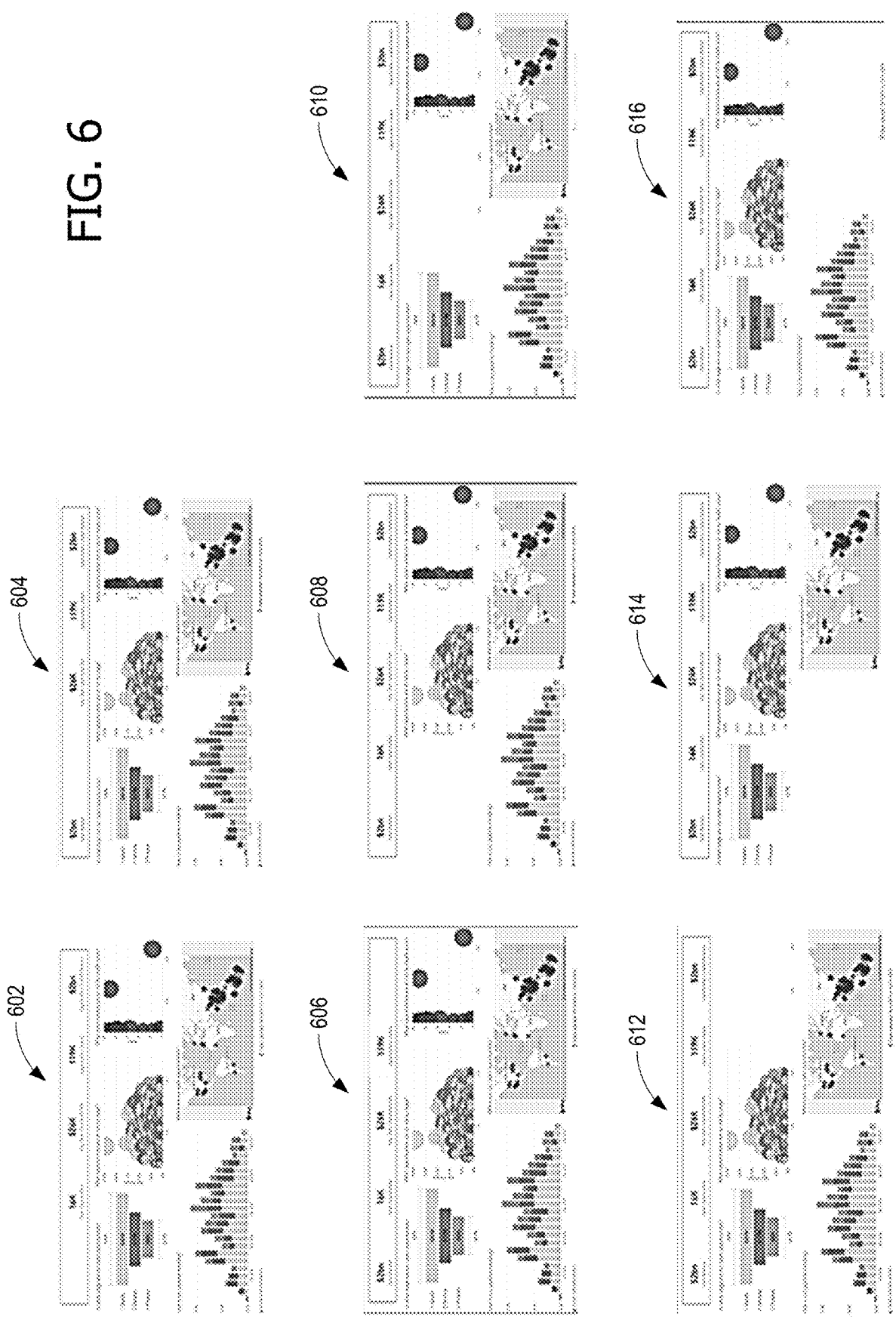

FIG. 7

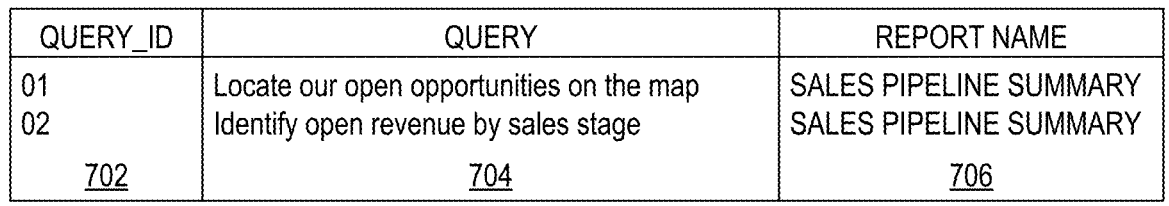

| QUERY_ID | QUERY | REPORT NAME |
|---|---|---|
| 01 | Locate our open opportunities on the map | SALES PIPELINE SUMMARY |
| 02 | Identify open revenue by sales stage | SALES PIPELINE SUMMARY |
| 702 | 704 | 706 |

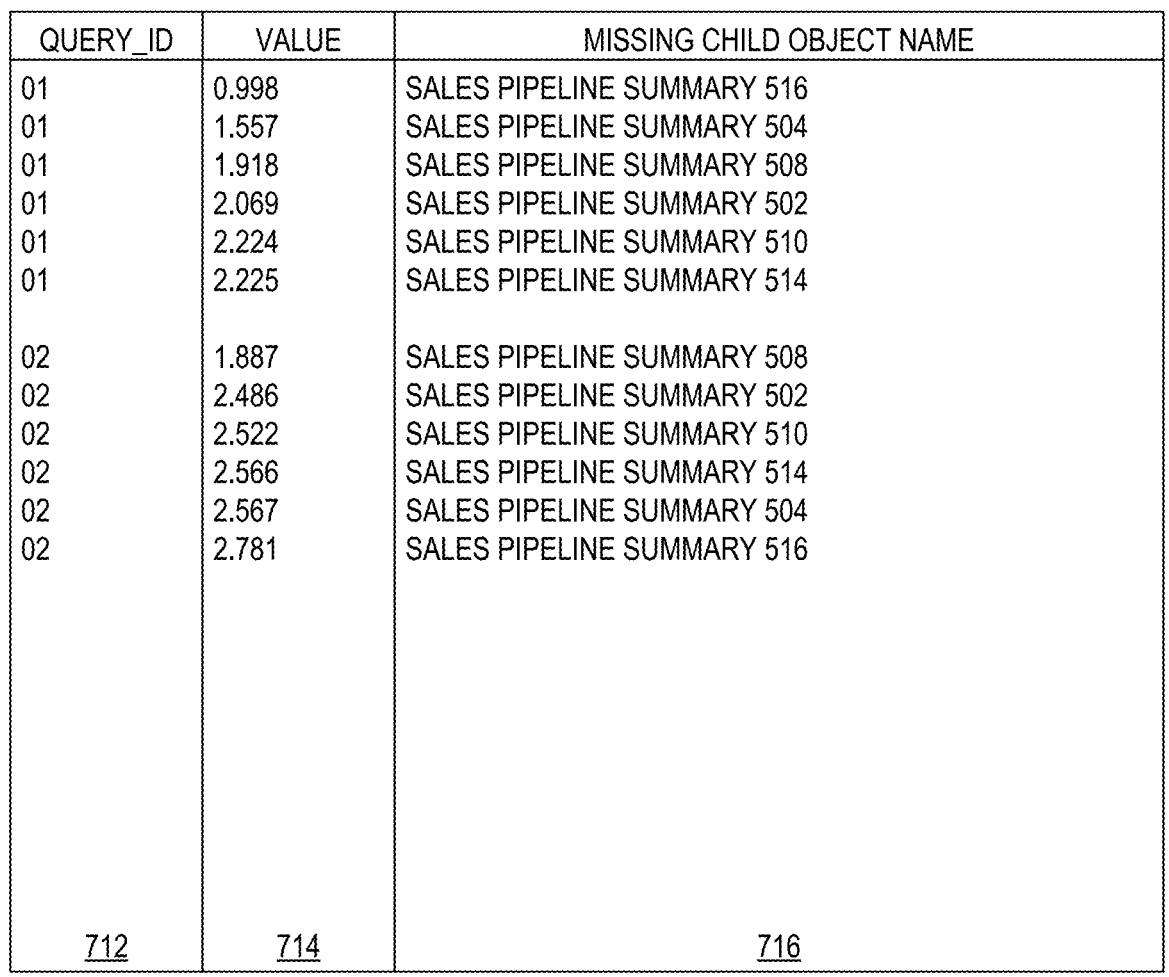

| QUERY_ID | VALUE | MISSING CHILD OBJECT NAME |
|---|---|---|
| 01 | 0.998 | SALES PIPELINE SUMMARY 516 |
| 01 | 1.557 | SALES PIPELINE SUMMARY 504 |
| 01 | 1.918 | SALES PIPELINE SUMMARY 508 |
| 01 | 2.069 | SALES PIPELINE SUMMARY 502 |
| 01 | 2.224 | SALES PIPELINE SUMMARY 510 |
| 01 | 2.225 | SALES PIPELINE SUMMARY 514 |
| | | |
| 02 | 1.887 | SALES PIPELINE SUMMARY 508 |
| 02 | 2.486 | SALES PIPELINE SUMMARY 502 |
| 02 | 2.522 | SALES PIPELINE SUMMARY 510 |
| 02 | 2.566 | SALES PIPELINE SUMMARY 514 |
| 02 | 2.567 | SALES PIPELINE SUMMARY 504 |
| 02 | 2.781 | SALES PIPELINE SUMMARY 516 |
| 712 | 714 | 716 |

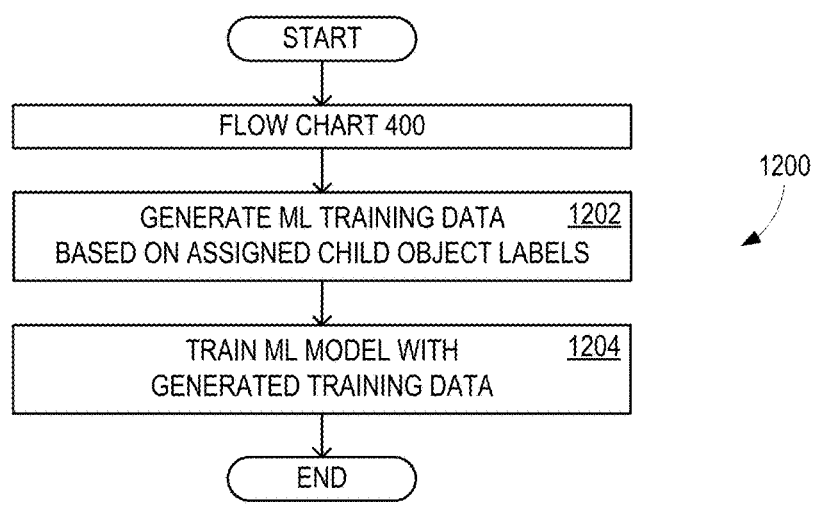
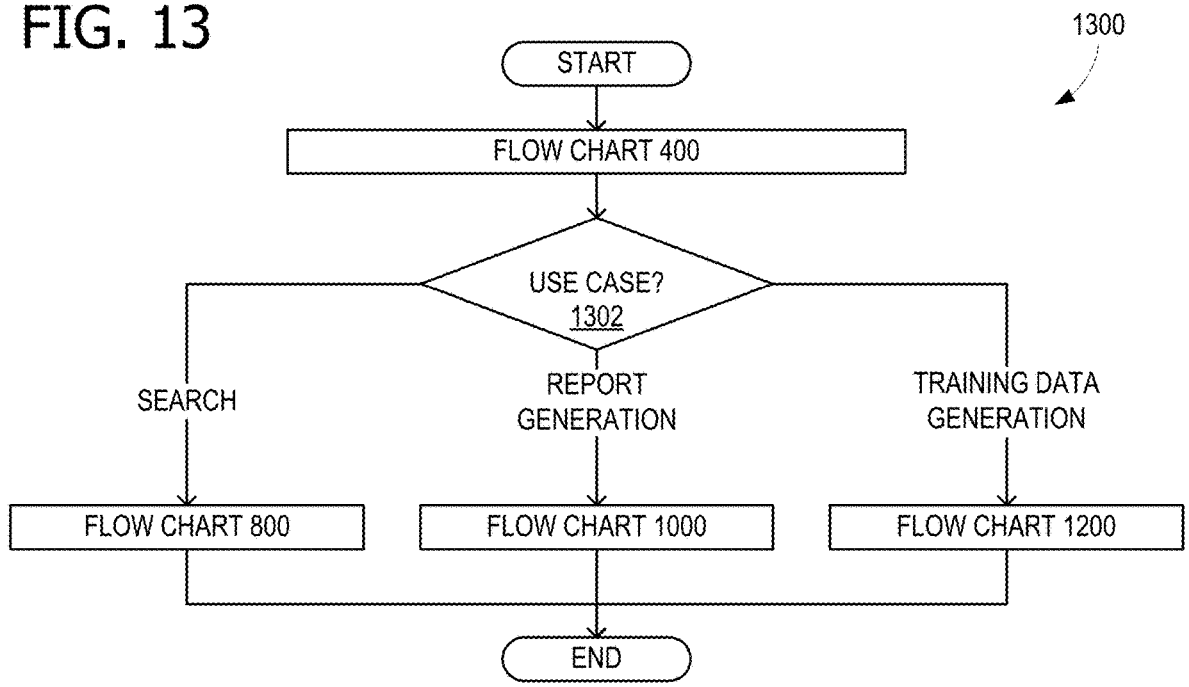

AUTOMATED LABELING OF CHILD OBJECTS WITHIN TAGGED PARENTS

BACKGROUND

In information-intensive activities, such business analytics, sales intelligence, and others, users are often presented with reports (or other data sets or documents) that have a myriad of disparate, data-rich sub-portions. For example, a user searching business intelligence reports for relevance to a certain query may receive a plethora of search result hits for which the most relevant portions are buried deep within the identified reports. This is because, when multiple reports each address multiple topics, not only may a single search find multiple reports, but any single report may be at least somewhat relevant to multiple different searches. Without a meaningful explanation for why each report was selected for a particular search, there is a risk that an overwhelmed user may fail to appreciate the significance of a relatively valuable find, and therefore not fully benefit from the available material.

Some search tools present summaries of search result hits that use the first paragraph of a document or a selection of sentences that happen to contain variants of search keywords. Neither solution is effective, however, at locating deeply-buried visualizations. Labeling of child objects (e.g., visualization and other objects) within parent objects (e.g., reports, documents, and other data sets) can permit identification of more highly relevant child objects, specific to a particular search query, when the parent object is included within the search results. Unfortunately, labeling objects to use in various tasks, such as selecting sub-portions (child objects) of search result hits to use as summaries, can be a prohibitively expensive, time-consuming process.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to solutions for automated labeling of child objects within tagged parents that include: receiving a plurality of parent objects, each parent object having a tag and each parent object including a plurality of child objects; receiving a machine learning (ML) component operable to rank the plurality of parent objects according to relevance to queries; for each parent object in the plurality of parent objects: generating a set of restricted objects from the parent object, wherein each restricted object is missing a child object of the parent object; for each query of a plurality of queries, ranking, with the ML component, the set of restricted objects according to relevance to the query; based at least on the query and an inverse of the rank of the set of restricted objects, assigning a child object label. In some examples, assigning a child object label includes: for the set of restricted objects, identifying a restricted object having a lowest relevance rank; for the restricted object having the lowest relevance rank, identifying the missing child object; and assigning, based at least on the query, a label to the missing child object. Various advantageous uses may be made of the assigned child labels, including enhancing search result reporting, automatically generating ML training data, and automatically generating and/or modifying reports.

BRIEF DESCRIPTION OF THE DRAWINGS

The disclosed examples are described in detail below with reference to the accompanying drawing figures listed below:

FIG. 6 shows a set of restricted objects generated from the parent object of FIG. 5;

FIG. 7 shows exemplary intermediary results of performing the operations of FIG. 4;

FIG. 12 is a flow chart illustrating exemplary operations involved in extending the flow chart of FIG. 4 to a use case involving generating machine learning (ML) training data;

FIG. 13 is a flow chart illustrating an exemplary combination of the flow charts of FIGS. 4 7, 10, and 12;

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Solutions for automated labeling of child objects within tagged parents are introduced that include: receiving a plurality of parent objects, each parent object having a tag and each parent object including a plurality of child objects; receiving a machine learning (ML) component operable to rank the plurality of parent objects according to relevance to queries; for each parent object in the plurality of parent objects: generating a set of restricted objects from the parent object, wherein each restricted object is missing a child object of the parent object; for each query of a plurality of queries, ranking, with the ML component, the set of restricted objects according to relevance to the query; based at least on the query and an inverse of the rank of the set of restricted objects, assigning a child object label. In some examples, assigning a child object label includes: for the set of restricted objects, identifying a restricted object having a lowest relevance rank; for the restricted object having the lowest relevance rank, identifying the missing child object; and assigning, based at least on the query, a label to the missing child object. Various advantageous uses may be made of the assigned child labels, including enhancing search result reporting, automatically generating ML training data, and automatically generating and/or modifying reports.

Figure 1:
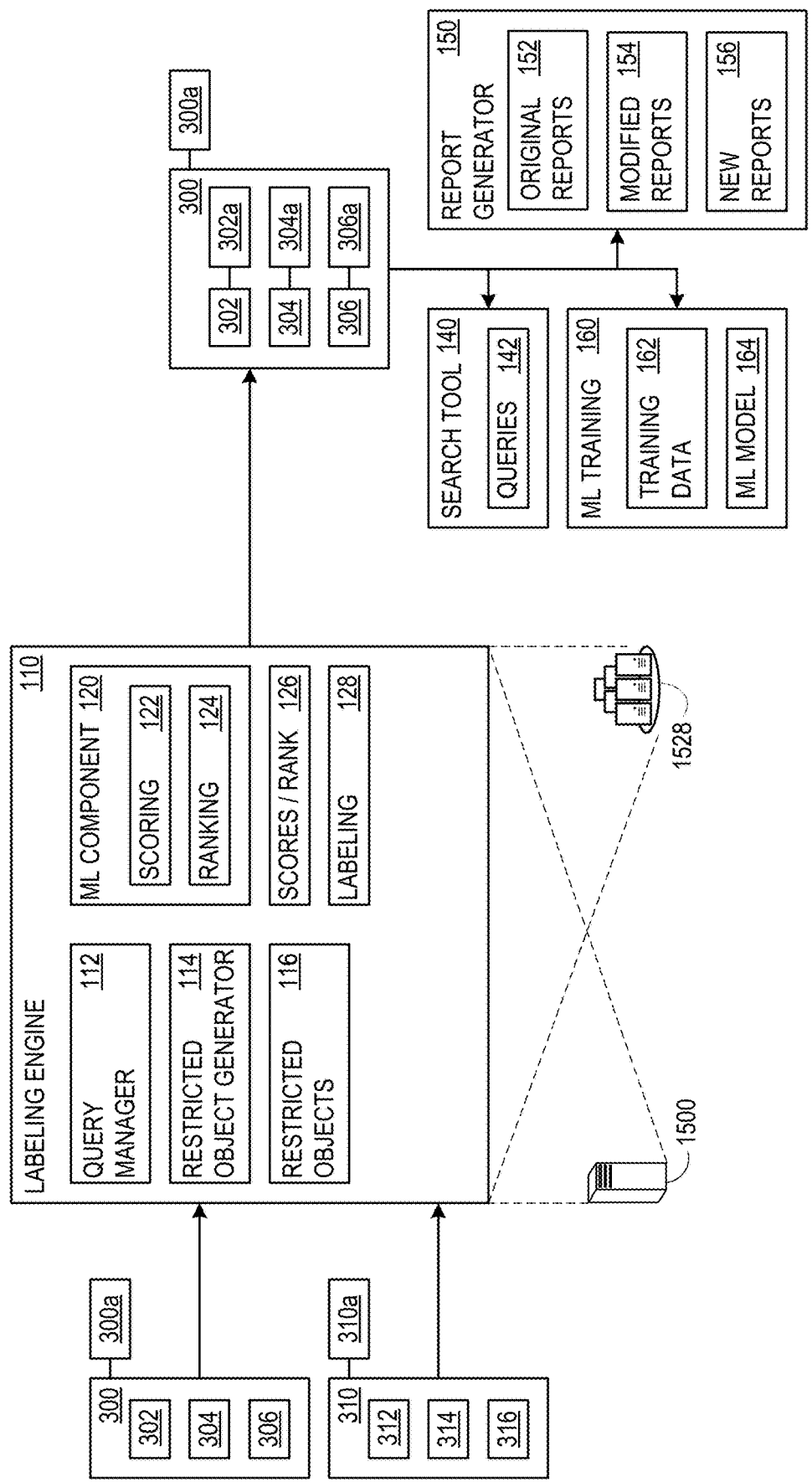
FIG. 1 illustrates an arrangement for automated labeling of child objects within tagged parents.
Figures 2, 3:
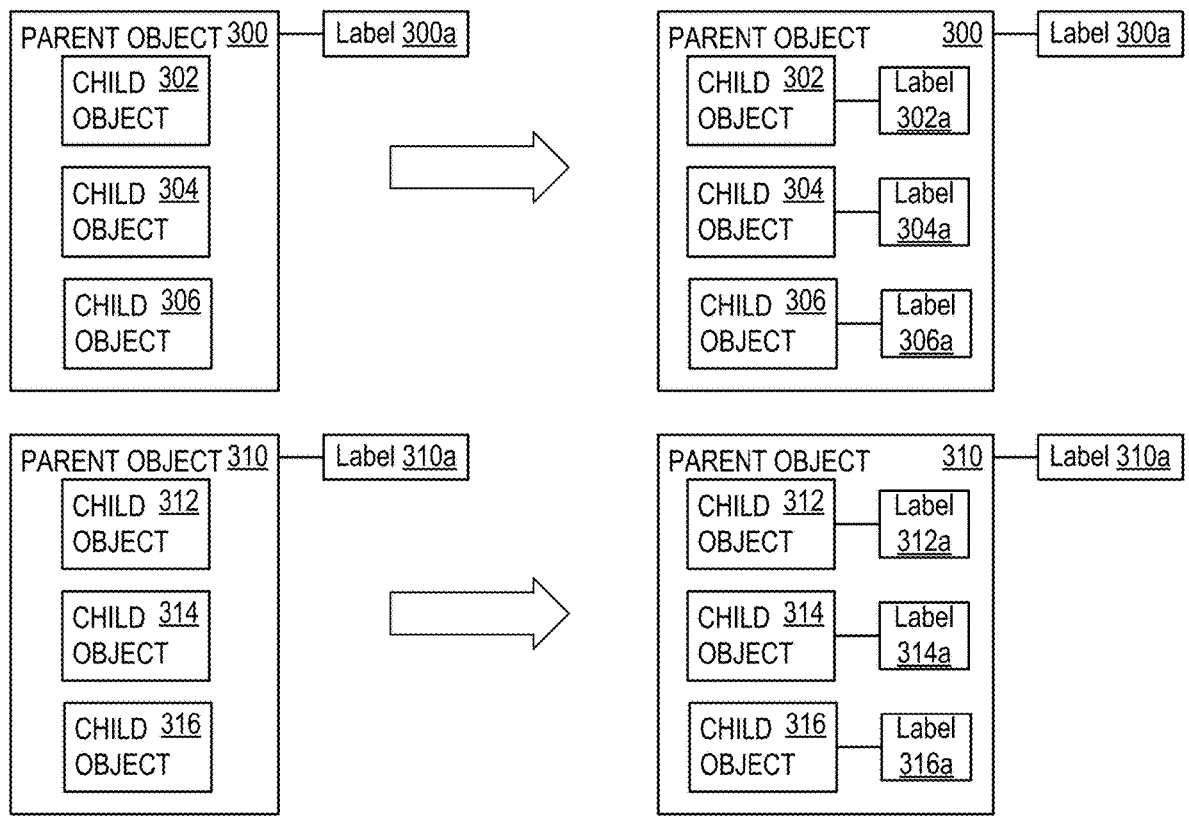
FIG. 2 shows a set of exemplary queries that can be advantageously improved by employing automated labeling of child objects within tagged parents.
FIG. 3 illustrates notional relationships of child object labels for multiple parent objects that is achievable using the arrangement of FIG. 1.

FIG. 1 illustrates an arrangement 100 for automated labeling of child objects within tagged parents. Arrangement 100 can be better understood in view of FIGS. 2 and 3. FIG. 2 shows a set of exemplary queries that can be advantageously improved by employing automated labeling of child objects within tagged parents. The text of the queries is listed in section 202 of table 200, and a report for which the queries are relevant is identified in section 204 of table 200. For example, when a user enters any of the queries listed in section 202 during a search event, the report identified in section 204 is returned. The queries are typically natural language input, and are analyzed by an ML component to match to labeled (tagged) data. In some examples, an ML component can also return a relevance value (e.g., score) for a returned report, data set, or other object. With multiple returned objects, the ML component can also rank the objects. In some examples, the ML component ranking a set of objects includes the ML component scoring the objects and a companion algorithm performing a simple sorting of the scores to complete the ranking.

However, the ML component will be most effective ranking (e.g., scoring, plus a sorting operation) when the objects are tagged with labels. Turning now to FIG. 3, notional relationships of parent and child objects are illustrated. On the left side of FIG. 3, parent objects 300 and 310 are shown. Each of parent objects 300 and 310 have sub-portions that are also identifiable as objects, which are child objects 302-306 in parent object 300 and child objects 312-316 in parent object 310. Example parent object and child object relationships include a document with portions such as sections, paragraphs, sentences, and figures (e.g., images, graphics, visuals). Thus, in some examples, the parent objects are report documents and the child objects are graphical components of the parent objects.

Initially, parent objects 300 and 310 are tagged (labeled) with tags 300a and 310a respectively, but child objects 302-306 and 312-316 have no tags or labels. Such a condition limits the effectiveness with which an ML component can evaluate child objects 302-306 and 312-316 for relevance to a query. For scenarios in which child objects 302-306 and 312-316 have widely disparate information, such that, for example, child objects 302 and 314 are highly relevant to a first query, and child objects 306 and 312 are highly relevant to a second, different query, the limited ability to evaluate the relevance of child objects 302-306 and 312-316 separately from parent objects 300 and 310 may curtail the potential value of the complete data set.

Therefore, arrangement 100, using techniques disclosed herein, is able to intelligently and automatically assign child object labels 302a-306a and 312a-316a, to a respective one of child objects 302-306 and 312-316. Such a capability can be advantageously employed to provide ML components with insight into the relevance of specific ones of child objects 302-306 and 312-316 within parent objects 300 and 310, as well as enable child objects 302-306 and 312-316 (paired with child object labels 302a-306a and 312a-316a) to be used as ML training data.

Returning now to FIG. 1, arrangement 100 includes a labeling engine 110 that receives a plurality of parent objects 300 and 310. As illustrated, parent object 300 has tag 300a and includes a plurality of child objects 302-306; parent object 310 has tag 310a and includes a plurality of child objects 312-316. Labeling engine 110 has a query manager 112 that forwards queries to an ML component 120. ML component 120 has a scoring component 122 and a ranking component 124 that are operable to rank the plurality of parent objects 300 and 310 according to relevance to queries from query manager 112. A restricted object generator 114 generates a set of restricted objects 116 from the parent objects 300 and 310, such that each restricted object is missing a child object of the parent object.

ML component 120 ranks restricted objects 116 according to relevance to a query or a plurality of queries, to produce score and rank values 126. A labeling component 128 then assigns a child object label (e.g., one of child object labels 302a-306a), based at least on the query and an inverse of the rank of restricted objects 116. The enhanced data, for example parent object 300 with labeled child objects 302-306 is now available for use with a search tool 140, a report generator 150, an ML training component 160, or other functions that can advantageously use labeled child objects.

As is described in the following figures, search tool 140, for example, is able to enhance search results that return parent object 300 in response to queries 142, by annotating the search results with the most relevant one of child objects 302-306. Report generator 150 is able to automatically modify original reports 152 (that include labeled child objects) to produce modified reports 154 be re-ordering child objects according to relevance. In some examples, report generator 150 is able to automatically produce new reports 156 using child objects from original reports 152. And in some examples, ML training component 160 is able to leverage child object labels 302a-306a to generate ML training data 162 for use in training an ML model 164. In some examples, ML training component 160 further trains ML component 120.

Figure 15:
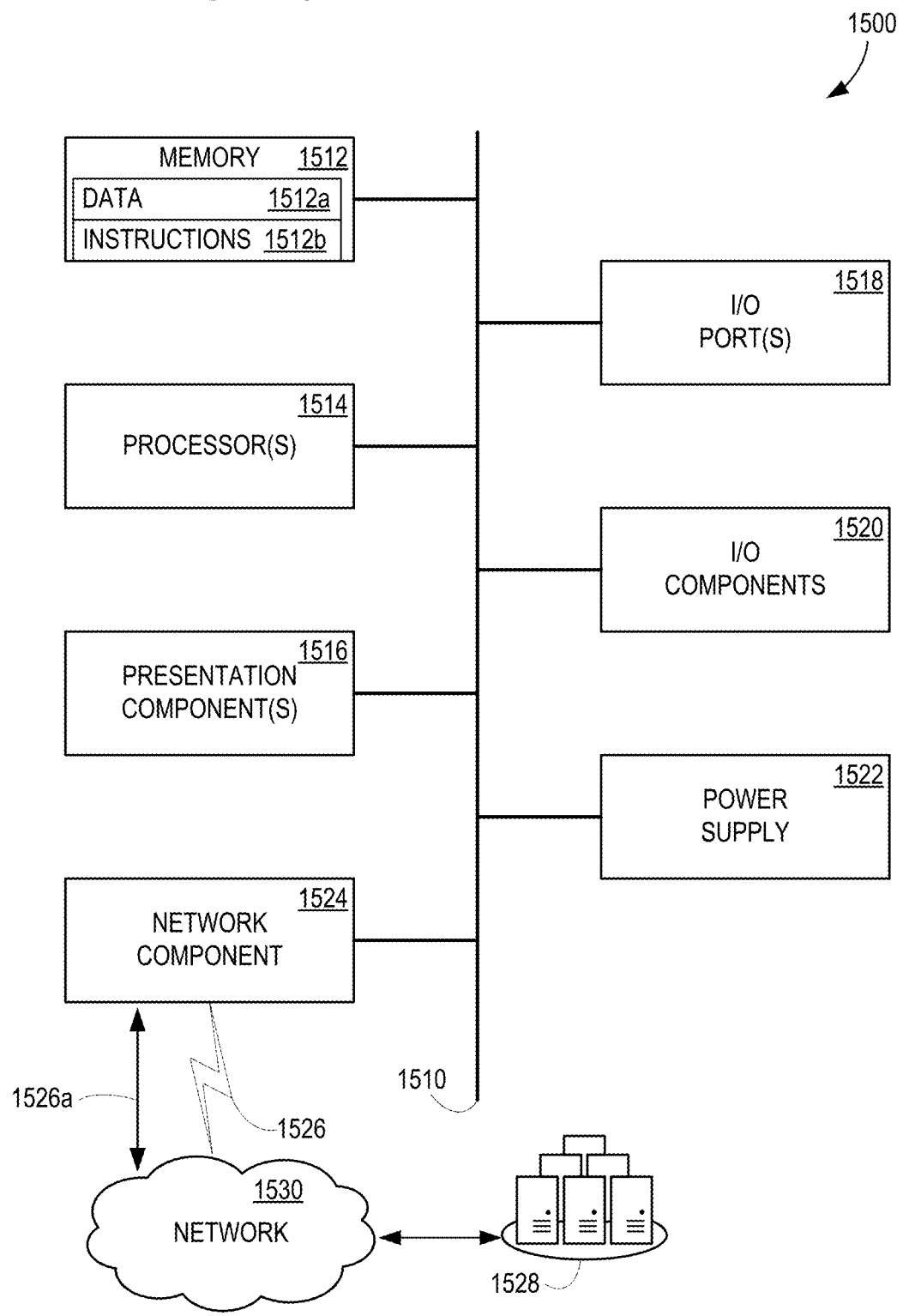
FIG. 15 is a block diagram of an example computing environment suitable for implementing some of the various examples disclosed herein.

In general, the various components of arrangement 100 (e.g., labeling engine 110, search tool 140, report generator 150, and ML training component 160) may be implemented on a computing device 1500 and/or a cloud resource 1528, which are described in further detail in relation to FIG. 15. Thus, at least some of the operations described herein for arrangement 100 may be implemented by a processor executing instructions that are stored on a computer-readable medium.

Figure 4:
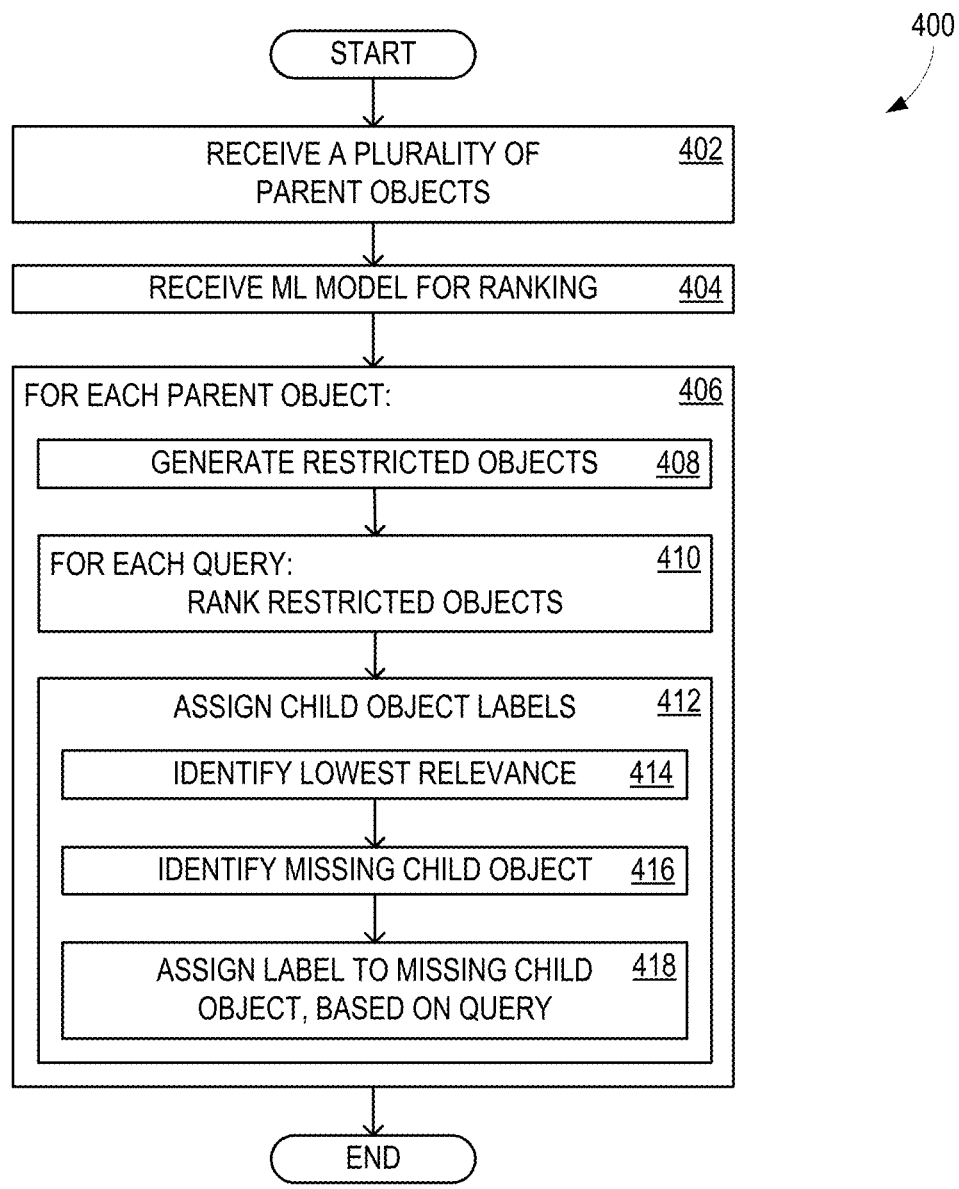
FIG. 4 is a flow chart illustrating exemplary operations involved in automated labeling of child objects within tagged parents, as performed by the arrangement 100 of FIG. 1.

FIG. 4 is a flow chart 400 illustrating exemplary operations involved in automated labeling of child objects within tagged parents, as performed by the arrangement 100 of FIG. 1. In some examples, operations described for flow chart 400 are performed by computing device 1500 of FIG. 15. Flow chart 400 commences with operation 402, which includes receiving a plurality of parent objects, each parent object having a tag and each parent object including a plurality of child objects. Operation 404 includes receiving an ML component operable to rank the plurality of parent objects according to relevance to queries. Operation 406 is performed for each parent object in the plurality of parent objects and includes operations 408-412.

Operation 408 includes generating a set of restricted objects from the parent object, wherein each restricted object is missing a child object of the parent object. This procedure is described in further detail in relation to FIGS. 5 and 6. Operation 410 includes, for each query of a plurality of queries, ranking, with the ML component, the set of restricted objects according to relevance to the query, and operation 412 includes, based at least on the query and an inverse of the rank of the set of restricted objects, assigning a child object label. In some examples, operation 412 includes mode detailed operations 414-418. Operation 412 is also described in further detail in relation to FIG. 7.

Operation 414 includes, for the set of restricted objects, identifying a restricted object having a lowest relevance rank. Operation 416 includes, for the restricted object having the lowest relevance rank, identifying the missing child object. Operation 418 includes assigning, based at least on the query, a label to the missing child object. At this point, the child labels have been automatically assigned and may be advantageously used for further tasks described in relation to FIGS. 7, 10 and 12. These tasks include improving search results, automatically modify and/or generating reports, and automatically labeling ML training data.

Figure 5:
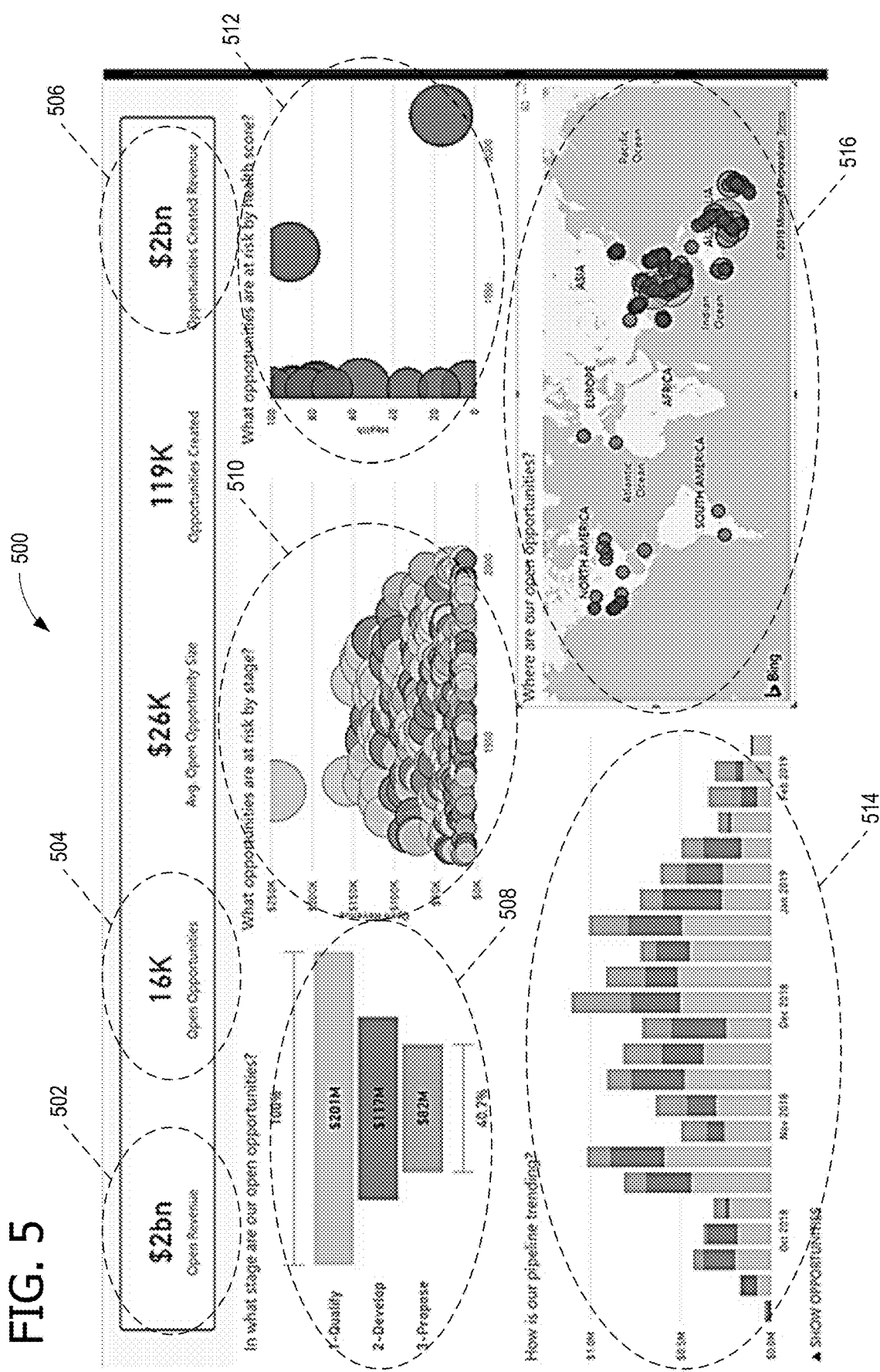
FIG. 5 shows an exemplary parent object used by the flow chart of FIG. 4.

FIG. 5 shows an exemplary parent object 500 used by flow chart 400. Parent object 500 is a business intelligence report containing multiple visuals as annotated child objects 502-516. Each of child objects 502-516 will, in turn, be removed from a copy of parent object 500 to generate a set of restricted objects, as shown in FIG. 6. FIG. 6 shows a set of restricted objects 602-616 that have been generated from parent object 500. Each of restricted objects 602-616 corresponds to a missing one of child objects 502-516. That is, restricted object 602 is missing child object 502; restricted object 604 is missing child object 504, and continuing this scheme, restricted object 616 is missing child object 516.

For a particular query, whichever one of restricted objects 602-616 has the least relevance, the corresponding missing child object is the most relevant to the query and will be labeled according to the query. For example, if restricted object 616 has the lowest relevance to a particular query, then child object 516 will be labeled according to the query.

FIG. 7 shows exemplary intermediary results of performing the operations of flow chart 400. A table 700 has three columns: a query_ID column 702, a query text column 704, and a report name column 706. As indicated, a query with query_ID=01 and query text "Locate our open opportunities on the map" is run against a "Sales Pipeline Summary" report. Additionally, another query with query_ID=02 and query text "Identify open revenue by sales stage" is also run against the "Sales Pipeline Summary" report. The relevance value results are provided in a table 710. Table 710 has three columns: a query_ID column 712, a relevance value column 714, and a missing child object name column 716.

As can be seen in table 710, for the two queries, various relevance values are listed in increasing value in relevance value column 714. These values are for the restricted objects that are each missing the corresponding child object identified in missing child object name column 716. Thus, the various relevance values generated by a ranking function (e.g., within an ML component) enable ranking a set of restricted objects according to relevance to a query. For example, for query_ID=01, the lowest relevance value is 0.998, and the identified missing child object is named "Sales Pipeline Summary 516." Therefore, the "Sales Pipeline Summary 516" child object will be assigned a label based on the query text "Locate our open opportunities on the map." Similarly, for query_ID=02, the lowest relevance value is 1.887, and the identified missing child object is named "Sales Pipeline Summary 508." Therefore, the "Sales Pipeline Summary 508" child object will be assigned a label based on the query text "Identify open revenue by sales stage."

Figure 8:
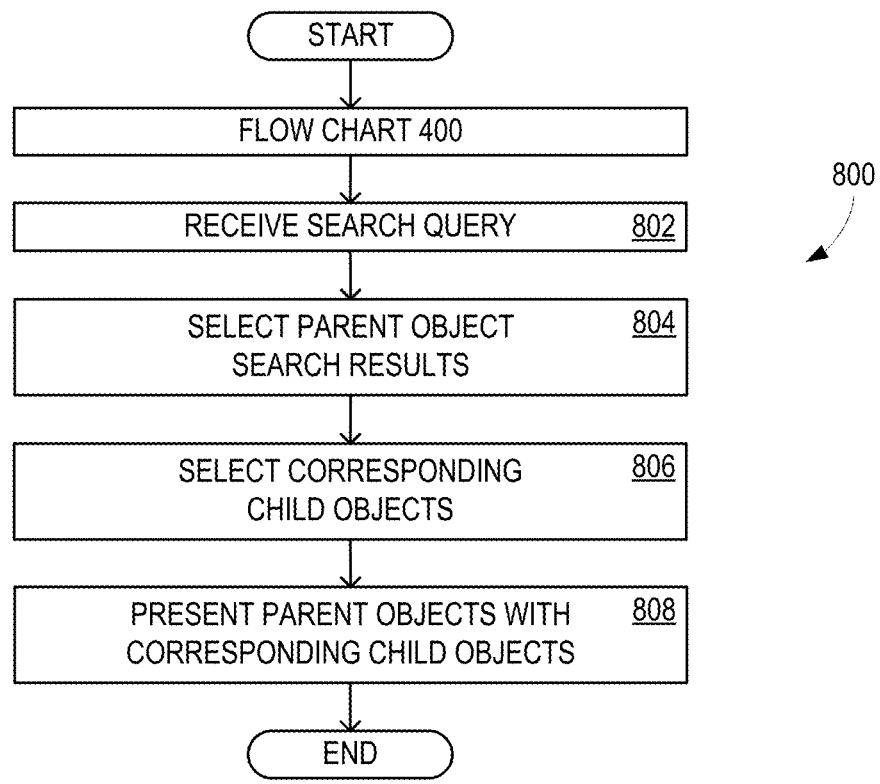
FIG. 8 is a flow chart illustrating exemplary operations involved in extending the flow chart of FIG. 4 to a use case involving searching for reports.

FIG. 8 is a flow chart 800 illustrating exemplary operations involved in extending flow chart 400 of FIG. 4 to a use case involving searching for reports. For example, a search engine may advantageously employ the operations of flow chart 800 when searching for existing reports in response to a query. In some examples, operations described for flow chart 800 are performed by computing device 1500 of FIG. 15. Flow chart 800 optionally follows flow chart 400, and commences with operation 802, which includes receiving the search query. Operation 804 includes selecting, based at least on a search query, a set of parent objects as parent object search results. Operation 806 includes selecting, for each parent object search result, based at least on the assigned child object labels and the search query, a corresponding child object. Operation 808 includes presenting, as search result hits, one or more parent object search results paired with the corresponding child objects.

Figure 9:
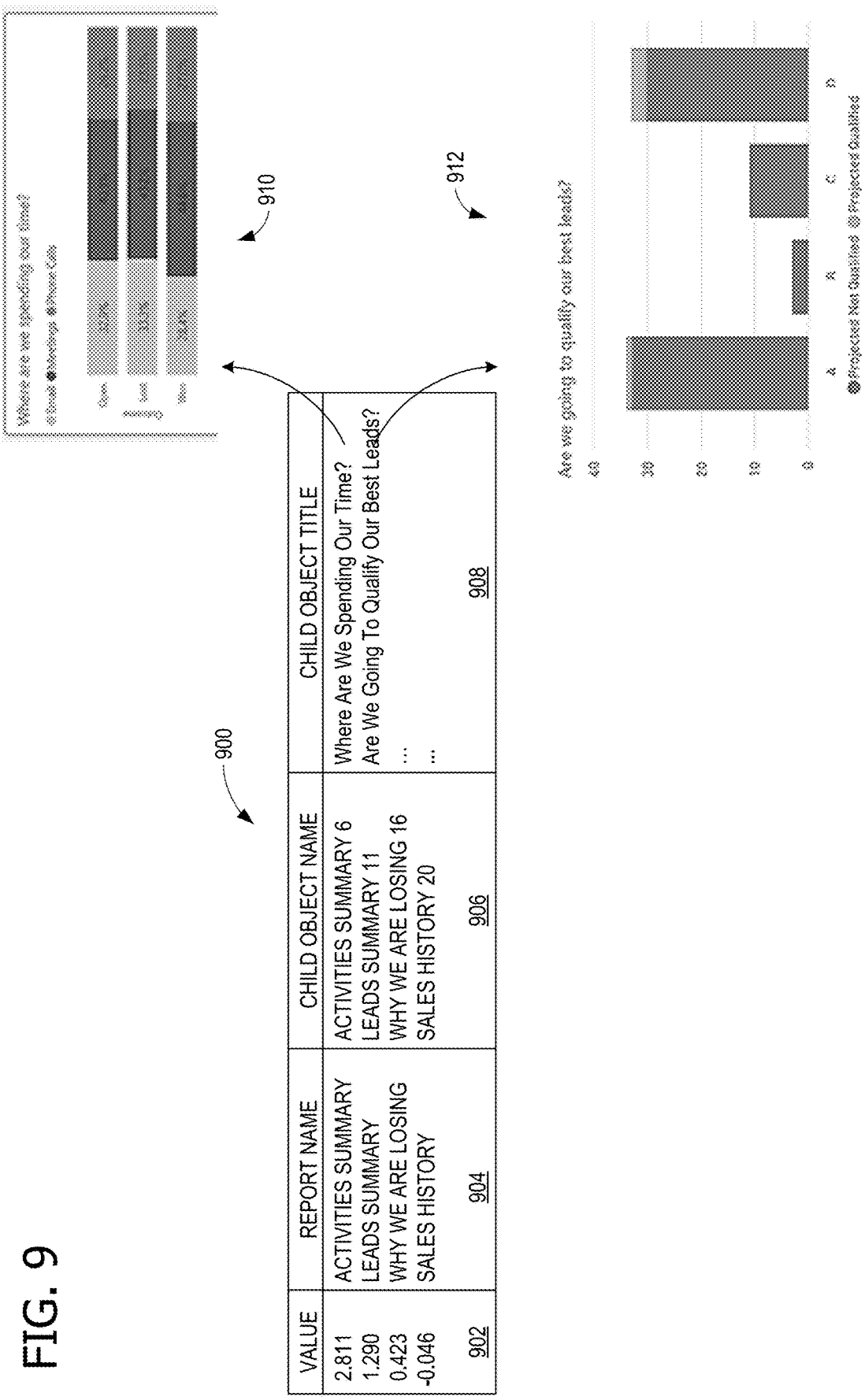
FIG. 9 shows exemplary intermediary results of performing the operations of FIG. 7.

FIG. 9 shows exemplary intermediary results of performing the operations of flow chart 800 (of FIG. 8) with an example query of 'Are we spending our time wisely?' A search results table 900 identifies search results. A relevance value column 902 has relevance values ranked in descending order (higher rank at the top), as determined by an ML ranking model. A report name column 904 identifies the name of the parent object search result that is the subject of the corresponding value in relevance value column 902. A corresponding child object, within each of the parent objects identified in report name column 904, that has the highest relevance (within its particular parent object) to the search query, is identified in a child object name column 906, by object name. A title for the child object, for example a figure label from a graphic or visual, or a section heading (for a child object that includes a textual passage), appears in a child object title column 908. Representative visuals 910 and 912 are shown for the top two parent object search results. In a search results hit presentation, a user will be shown the parent object (as the report name from report name column 904) and the corresponding selected child object (e.g., visuals 910 and 912). The display of the selected visuals can assist the user with more rapidly assessing the value of the parent object search result.

Figure 10:
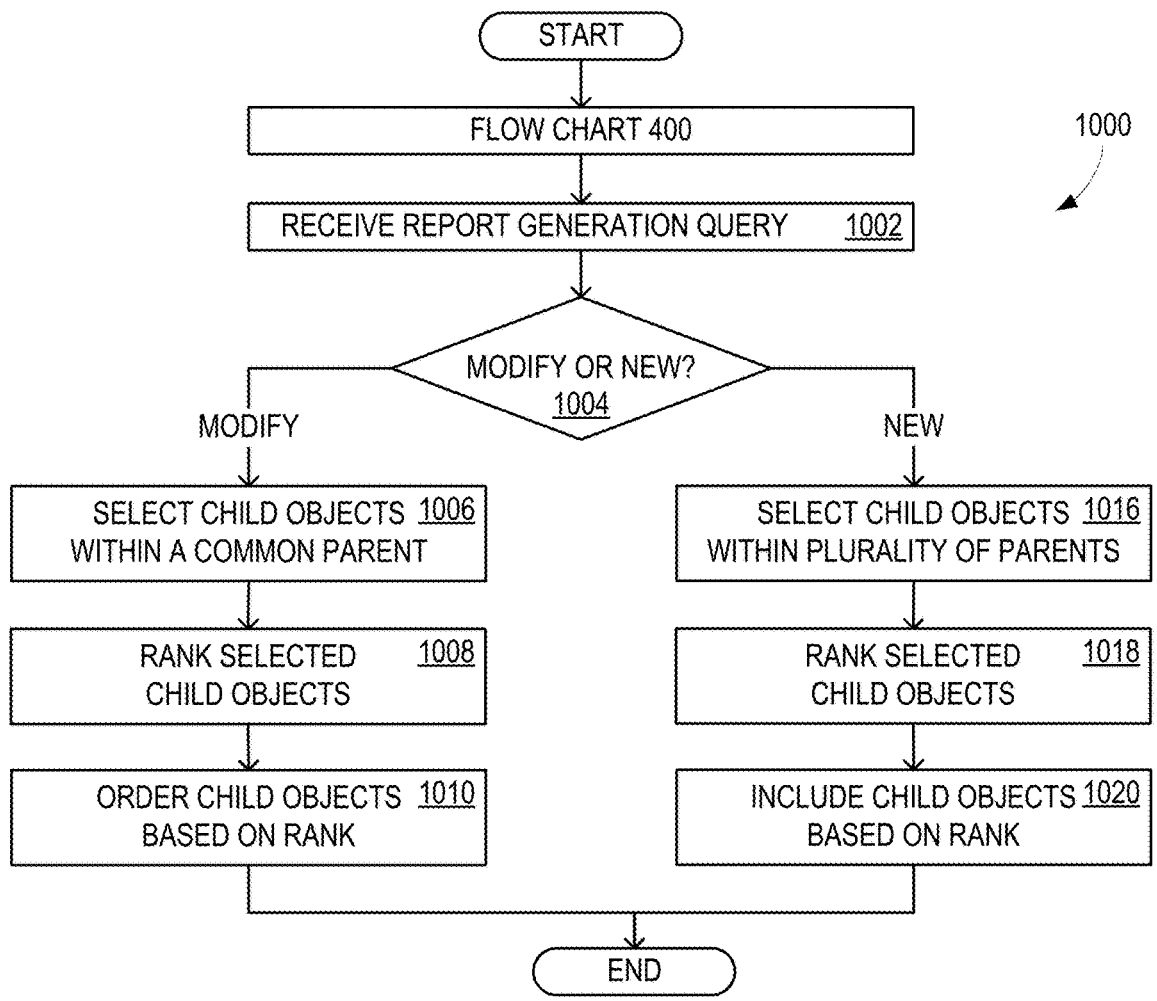
FIG. 10 is a flow chart illustrating exemplary operations involved in extending the flow chart of FIG. 4 to a use case involving modifying reports or automatically generating new reports.

FIG. 10 is a flow chart 1000 illustrating exemplary operations involved in extending flow chart 400 of FIG. 4 to a use case involving modifying reports or automatically generating new reports. In some examples, operations described for flow chart 1000 are performed by computing device 1500 of FIG. 15. Flow chart 1000 optionally follows flow chart 400, and commences with operation 1002, which includes receiving a report generation query, for example, from a user who wishes to receive a custom report on a particular topic. Decision operation 1004 includes determining whether an existing report (parent object) will be modified by re-ordering the child objects (e.g., sections, paragraphs, visuals) to place the more relevant information closer to the front, or whether a new report will be generated by combining the child objects from a plurality of reports.

If the modification option is to be exercised, operation 1006 includes selecting, based at least on the assigned child object labels and a report generation query, a set of child objects relevant to the report generation query, the selected child objects within a common parent object. The common parent object, in this scenario, is an existing report. Operation 1008 includes ranking the selected child objects according to relevance to the report generation query. Operation 1010 includes generating a custom report, based at least upon a portion of the common parent object, in which the selected child objects are ordered, within the custom report, based at least on the ranking of the selected child objects. That is, in some examples, the paragraphs, sections, graphics, and other visuals of the report are re-ordered to place the most relevant ones closer to the front of the report.

If, however, the new report option is to be exercised, operation 1016 includes selecting, based at least on the assigned child object labels and a report generation query, a set of child objects relevant to the report generation query, the selected child objects within a plurality of parent objects. The plurality of parent objects, in this scenario, is a set of multiple existing reports or data sets from which material can be pulled to automatically generate a new report. Operation 1018 is similar to operation 1008 and will rank the selected child objects according to relevance to the report generation query. Operation 1020 includes generating a custom report including, based at least upon the ranking of the selected child objects, at least a portion of the selected child objects. Thus, at least some of the child objects, pulled from prior existing reports and data sets, are used to build the new custom report.

Figure 11:
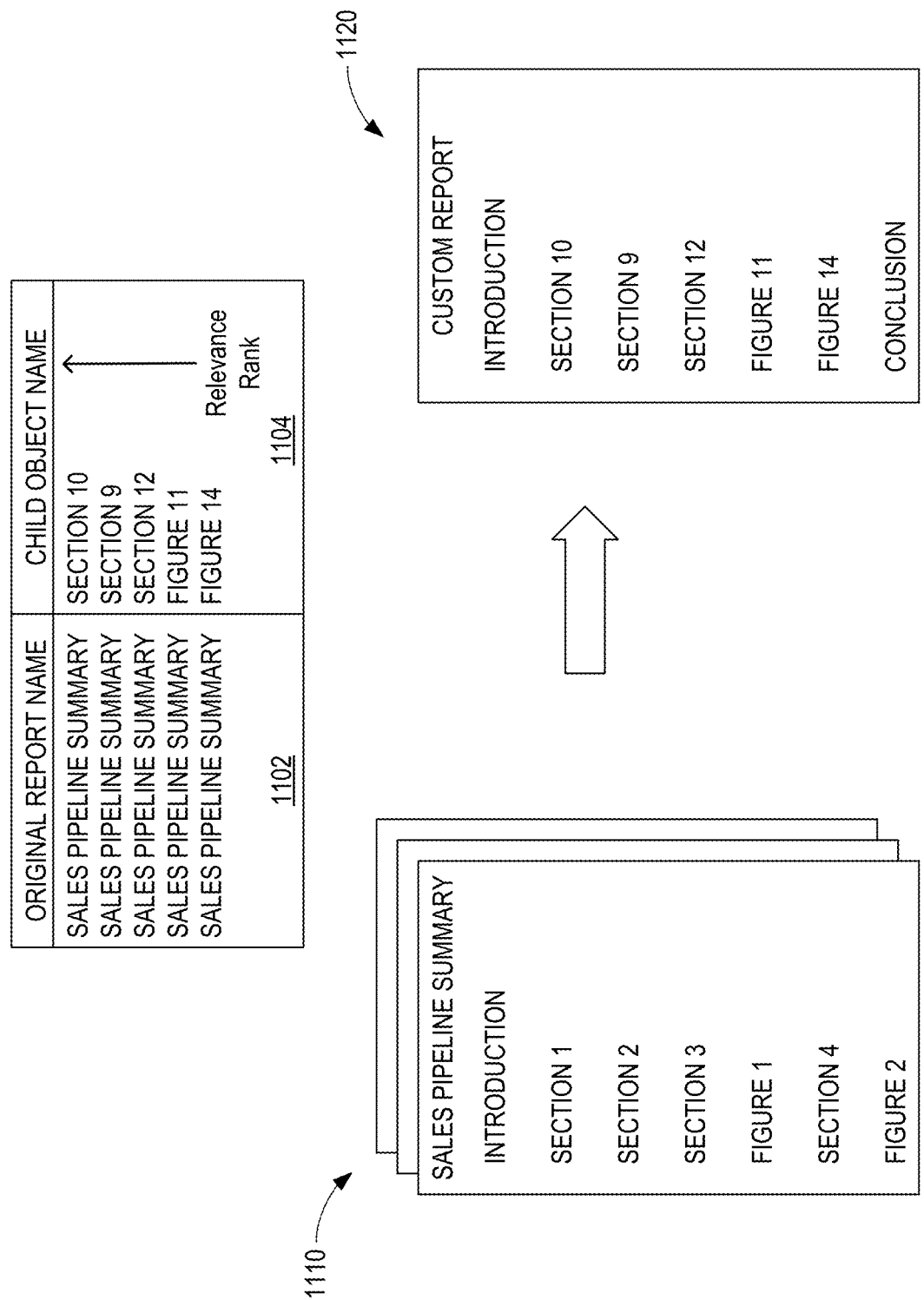
FIG. 11 shows exemplary intermediary results of performing the operations of FIG. 10.

FIG. 11 shows exemplary intermediary results of performing the operations of flow chart 1000. An existing report 1110 (parent object) is used as a basis for a custom report 1120. Custom report 1120 is built from components (child objects) found within existing report 1110, but ordered according to relevance to a query, so that the more relevant information is found earlier within custom report 1120 than within existing report 1110. A notional table 1100 has a first column 1102 indicating the name of the parent object. In this illustrated example, since a common parent object (existing report 1110) is used, the names of the parent object on the different lines are the same. For building a new report from a plurality of parent objects, the names in column 1102 may vary. A second column 1104 of notional table 1100 lists child objects by relevance rank, with higher-ranked child objects at the top. Some number (at least a portion) of these child objects are selected for inclusion in custom report 1120, as shown.

FIG. 12 is a flow chart 1200 illustrating exemplary operations involved in extending flow chart 400 of FIG. 4 to a use case involving generating ML training data. In some examples, operations described for flow chart 1200 are performed by computing device 1500 of FIG. 15. Flow chart 1200 optionally follows flow chart 400, and commences with operation 1202, which includes generating, based at least on the assigned child object labels, ML training data. Operation 1204 then includes training an ML model with the generated ML training data. In some examples, the ML model being trained is ML component 120 (of FIG. 1), that was used to rank the relevance of the restricted objects in flow chart 400 and also used to rank child objects in flow charts 700 and 1000. In some examples, a different ML model is trained.

FIG. 13 is a flow chart 1300 illustrating an exemplary combination of flow charts 400, 800, 1000, and 1200 of FIGS. 4, 7, 10, and 12, respectively. In some examples, operations described for flow chart 1300 are performed by computing device 1500 of FIG. 15. Flow chart 1300 illustrates some of the wide-ranging applicability of automated labeling of child objects within tagged parents. Although three use cases are illustrated in flow chart 1300, it should be understood that a larger number of use cases and applications are possible.

Flow chart 1300 commences with performing the operations of flow chart 400, which assigns the child object labels. Decision operation 1302 then determines a particular use case for the child object labels. For improving search results, flow chart 800 is employed. For automated report generation and/or modification, flow chart 1000 is employed. For automated generation of ML data, flow chart 1200 is employed.

Figure 14:
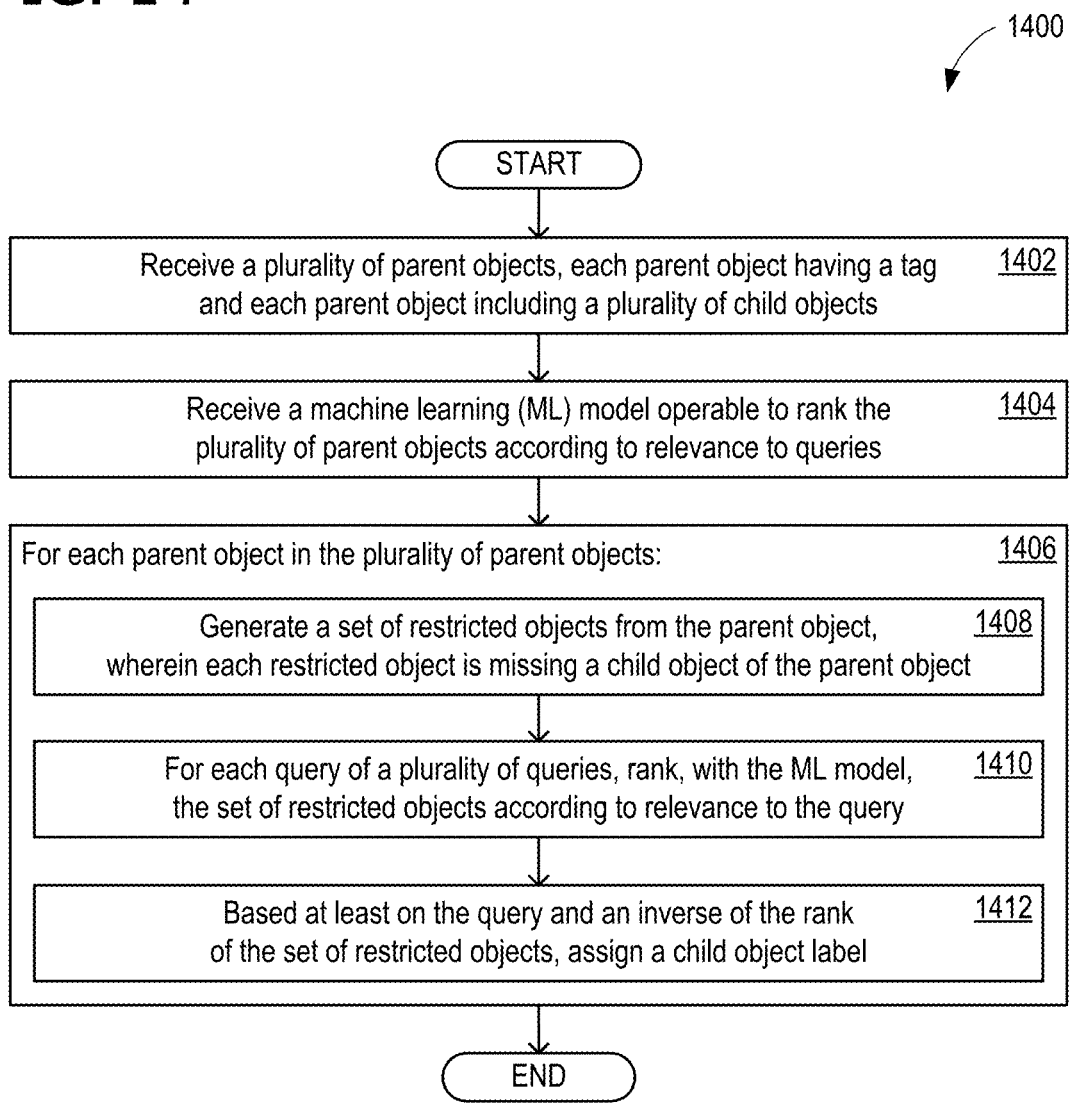
FIG. 14 is another flow chart illustrating exemplary operations involved in automated labeling of child objects within tagged parents, as performed by the arrangement 100 of FIG. 1.

FIG. 14 is a flow chart 1400 illustrating exemplary operations involved in automated labeling of child objects within tagged parents, as performed by arrangement 100. In some examples, operations described for flow chart 1400 are performed by computing device 1500 of FIG. 15. Flow chart 1400 commences with operation 1402, which includes receiving a plurality of parent objects, each parent object having a tag and each parent object including a plurality of child objects. Operation 1404 includes receiving an ML component operable to rank the plurality of parent objects according to relevance to queries. Operation 1406 includes operations 1408-1412, which are performed for each parent object in the plurality of parent objects. Operation 1408 includes generating a set of restricted objects from the parent object, wherein each restricted object is missing a child object of the parent object. Operation 1410 includes, for each query of a plurality of queries, ranking, with the ML component, the set of restricted objects according to relevance to the query. Operation 1412 includes, based at least on the query and an inverse of the rank of the set of restricted objects, assigning a child object label. In some examples, the parent objects are report documents and the child objects are graphical components (e.g., visuals) of the parent objects (report documents).

Additional Examples

Some aspects and examples disclosed herein are directed to a system for automated labeling of child objects within tagged parents comprising: a processor; and a computer-readable medium storing instructions that are operative upon execution by the processor to: receive a plurality of parent objects, each parent object having a tag and each parent object including a plurality of child objects; receive an ML component operable to rank the plurality of parent objects according to relevance to queries; and for each parent object in the plurality of parent objects: generate a set of restricted objects from the parent object, wherein each restricted object is missing a child object of the parent object; for each query of a plurality of queries, rank, with the ML component, the set of restricted objects according to relevance to the query; and based at least on the query and an inverse of the rank of the set of restricted objects, assign a child object label.

Additional aspects and examples disclosed herein are directed to a method of automated labeling of child objects within tagged parents comprising: receiving a plurality of parent objects, each parent object having a tag and each parent object including a plurality of child objects; receiving an ML component operable to rank the plurality of parent objects according to relevance to queries; and for each parent object in the plurality of parent objects: generating a set of restricted objects from the parent object, wherein each restricted object is missing a child object of the parent object; for each query of a plurality of queries, ranking, with the ML component, the set of restricted objects according to relevance to the query; and based at least on the query and an inverse of the rank of the set of restricted objects, assigning a child object label.

Additional aspects and examples disclosed herein are directed to one or more computer storage devices having computer-executable instructions stored thereon for automated labeling of child objects within tagged parents, which, on execution by a computer, cause the computer to perform operations comprising: receiving a plurality of parent objects, each parent object having a tag and each parent object including a plurality of child objects, wherein the parent objects are report documents and the child objects are graphical components of the parent objects; receiving an ML component operable to rank the plurality of parent objects according to relevance to queries; for each parent object in the plurality of parent objects: generating a set of restricted objects from the parent object, wherein each restricted object is missing a child object of the parent object; for each query of a plurality of queries, ranking, with the ML component, the set of restricted objects according to relevance to the query; based at least on the query and an inverse of the rank of the set of restricted objects, assigning a child object label, wherein based at least on the query and an inverse of the rank of the set of restricted objects, assigning a child object label comprises: for the set of restricted objects, identifying a restricted object having a lowest relevance rank; for the restricted object having the lowest relevance rank, identifying the missing child object; and assigning, based at least on the query, a label to the missing child object.

Alternatively, or in addition to the other examples described herein, examples include any combination of the following:
  for the set of restricted objects, identifying a restricted object having a lowest relevance rank;
  for the restricted object having the lowest relevance rank, identifying the missing child object;
  assigning, based at least on the query, a label to the missing child object;
  the plurality of queries is based at least on the parent object tags;
  selecting, based at least on a search query, a set of parent objects as parent object search results;
  selecting, for each parent object search result, based at least on the assigned child object labels and the search query, a corresponding child object;
  presenting, as search result hits, one or more parent object search results paired with the corresponding child objects;
  selecting, based at least on the assigned child object labels and a report generation query, a set of child objects relevant to the report generation query, the selected child objects within a common parent object;
  ranking the selected child objects according to relevance to the report generation query;
  generating a first custom report, based at least upon a portion of the common parent object, in which the selected child objects are ordered, within the first custom report, based at least on the ranking of the selected child objects;
  selecting, based at least on the assigned child object labels and a report generation query, a set of child objects relevant to the report generation query, the selected child objects within a plurality of parent objects;
  ranking the selected child objects according to relevance to the report generation query;
  generating a second custom report including, based at least upon the ranking of the selected child objects, at least a portion of the selected child objects;
  generating, based at least on the assigned child object labels, ML training data; and
  training an ML model with the generated ML training data.

While the aspects of the disclosure have been described in terms of various examples with their associated operations, a person skilled in the art would appreciate that a combination of operations from any number of different examples is also within scope of the aspects of the disclosure.

Example Operating Environment

FIG. 15 is a block diagram of an example computing device 1500 for implementing aspects disclosed herein, and is designated generally as computing device 1500. Computing device 1500 is an example of a suitable computing environment and is not intended to suggest any limitation as to the scope of use or functionality of the examples disclosed herein. Neither should computing device 1500 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1500 includes a bus 1510 that directly or indirectly couples the following devices: computer-storage memory 1512, one or more processors 1514, one or more presentation components 1516, I/O ports 1518, I/O components 1520, a power supply 1522, and a network component 1524. While computing device 1500 is depicted as a seemingly single device, multiple computing devices 1500 may work together and share the depicted device resources. For example, memory 1512 may be distributed across multiple devices, and processor(s) 1514 may be housed with different devices.

Bus 1510 represents what may be one or more busses (such as an address bus, data bus, or a combination thereof). Although the various blocks of FIG. 15 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 15 and the references herein to a "computing device." Memory 1512 may take the form of the computer-storage media references below and operatively provide storage of computer-readable instructions, data structures, program modules and other data for computing device 1500. In some examples, memory 1512 stores one or more of an operating system, a universal application platform, or other program modules and program data. Memory 1512 is thus able to store and access data 1512*a* and instructions 1512*b* that are executable by processor 1514 and configured to carry out the various operations disclosed herein.

In some examples, memory 1512 includes computer-storage media in the form of volatile and/or nonvolatile memory, removable or non-removable memory, data disks in virtual environments, or a combination thereof. Memory 1512 may include any quantity of memory associated with or accessible by computing device 1500. Memory 1512 may be internal to computing device 1500 (as shown in FIG. 15), external to computing device 1500 (not shown), or both (not shown). Examples of memory 1512 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1500. Additionally, or alternatively, memory 1512 may be distributed across multiple computing devices 1500, for example, in a virtualized environment in which instruction processing is carried out on multiple computing devices 1500. For the purposes of this disclosure, "computer storage media," "computer-storage memory," "memory," and "memory devices" are synonymous terms for computer-storage memory 1512, and none of these terms include carrier waves or propagating signaling.

Processor(s) 1514 may include any quantity of processing units that read data from various entities, such as memory 1512 or I/O components 1520, and may include CPUs and/or GPUs. Specifically, processor(s) 1514 are programmed to execute computer-executable instructions for implementing aspects of the disclosure. The instructions may be performed by the processor, by multiple processors within computing device 1500, or by a processor external to client computing device 1500. In some examples, processor (s) 1514 are programmed to execute instructions such as those illustrated in the flow charts discussed below and depicted in the accompanying drawings. Moreover, in some examples, processor(s) 1514 represent an implementation of analog techniques to perform the operations described herein. For example, the operations may be performed by an analog client computing device 1500 and/or a digital client computing device 1500. Presentation component(s) 1516 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1500, across a wired connection, or in other ways. I/O ports 1518 allow computing device 1500 to be logically coupled to other devices including I/O components 1520, some of which may be built in. Example I/O components 1520 include, for example but without limitation, a microphone, joystick, game pad, satellite dish, scanner, printer, wireless device, etc.

Computing device 1500 may operate in a networked environment via network component 1524 using logical connections to one or more remote computers. In some examples, network component 1524 includes a network interface card and/or computer-executable instructions (e.g., a driver) for operating the network interface card. Communication between computing device 1500 and other devices may occur using any protocol or mechanism over any wired or wireless connection. In some examples, network component 1524 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1524 communicates over wireless communication link 1526 and/or a wired communication link 1526*a* to a cloud resource 1528 across network 1530. Various different examples of communication links 1526 and 1526*a* include a wireless connection, a wired connection, and/or a dedicated link, and in some examples, at least a portion is routed through the internet.

Although described in connection with an example computing device 1500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for automated labeling of child objects within tagged parents, the system comprising:
   a processor; and
   a computer-readable medium storing instructions that are operative upon execution by the processor to:
   receive a plurality of parent objects, each parent object having a tag and each parent object including a plurality of child objects;
   receive a machine learning (ML) component operable to rank the plurality of parent objects according to relevance to queries; and
   for each parent object in the plurality of parent objects:
   generate a set of restricted objects from the parent object, wherein each restricted object is generated by generating a copy of the parent object and removing, in turn, each child object in the plurality of child objects from the copy of the parent object and each restricted object corresponds to each removed child object in the plurality of child objects;
   for each query of a plurality of queries, rank, with the ML component, the set of restricted objects according to relevance to the query;
   based at least on the query and an inverse of the rank of the set of restricted objects, identify a least relevant restricted object of the set of restricted objects, the least relevant restricted object having a lowest relevance rank;
   identity the child object removed from the least relevant restricted object; and
   assign a child object label to the identified child object.

2. The system of claim 1, wherein at least one parent object of the plurality of parent objects comprises a document and at least one child object of the plurality of child objects comprises a graphic component with an annotation.

3. The system of claim 1, wherein the plurality of queries is based at least on the parent object tags.

4. The system of claim 1, wherein the instructions are further operative to:
   select, based at least on a search query, a set of parent objects as parent object search results;
   select, for each parent object search result, based at least on the assigned child object labels and the search query, a corresponding child object; and
   present, as search result hits, one or more parent object search results paired with the corresponding child objects.

5. The system of claim 1, wherein the instructions are further operative to:
   select, based at least on the assigned child object labels and a report generation query, a set of child objects relevant to the report generation query, the selected child objects within a common parent object;
   rank the selected child objects according to relevance to the report generation query; and
   generate a first custom report, based at least upon a portion of the common parent object, in which the selected child objects are ordered, within the first custom report, based at least on the ranking of the selected child objects.

6. The system of claim 1, wherein the instructions are further operative to:
   select, based at least on the assigned child object labels and a report generation query, a set of child objects relevant to the report generation query, the selected child objects within a plurality of parent objects;
   rank the selected child objects according to relevance to the report generation query; and
   generate a second custom report including, based at least upon the ranking of the selected child objects, at least a portion of the selected child objects.

7. The system of claim 1, wherein the instructions are further operative to:
   generate, based at least on the assigned child object labels, ML training data; and
   train an ML model with the generated ML training data.

8. A method of automated labeling of child objects within tagged parents, the method comprising:
   receiving a plurality of parent objects, each parent object having a tag and each parent object including a plurality of child objects;

receiving a machine learning (ML) component operable to rank the plurality of parent objects according to relevance to queries; and for each parent object in the plurality of parent objects:
generating a set of restricted objects from the parent object, wherein each restricted object is generated by generating a copy of the parent object and removing, in turn, each child object in the plurality of child objects from the copy of the parent object and each restricted object corresponds to each removed child object in the plurality of child objects;

for each query of a plurality of queries, ranking, with the ML component, the set of restricted objects according to relevance to the query;

based at least on the query and an inverse of the rank of the set of restricted objects, identifying a least relevant restricted object of the set of restricted objects, the least relevant restricted object having a lowest relevance rank;

identifying the child object removed from the least relevant restricted object; and assigning a child object label to the identified child object.

9. The method of claim 8, wherein at least one parent object of the plurality of parent objects comprises a document and at least one child object of the plurality of child objects comprises a graphic component with an annotation.

10. The method of claim 8, wherein the plurality of queries is based at least on the parent object tags.

11. The method of claim 8, further comprising:
selecting, based at least on a search query, a set of parent objects as parent object search results;
selecting, for each parent object search result, based at least on the assigned child object labels and the search query, a corresponding child object; and
presenting, as search result hits, one or more parent object search results paired with the corresponding child objects.

12. The method of claim 8, further comprising:
selecting, based at least on the assigned child object labels and a report generation query, a set of child objects relevant to the report generation query, the selected child objects within a common parent object;
ranking the selected child objects according to relevance to the report generation query; and
generating a first custom report, based at least upon a portion of the common parent object, in which the selected child objects are ordered, within the first custom report, based at least on the ranking of the selected child objects.

13. The method of claim 8, further comprising:
selecting, based at least on the assigned child object labels and a report generation query, a set of child objects relevant to the report generation query, the selected child objects within a plurality of parent objects;
ranking the selected child objects according to relevance to the report generation query; and
generating a second custom report including, based at least upon the ranking of the selected child objects, at least a portion of the selected child objects.

14. The method of claim 8, further comprising:
generating, based at least on the assigned child object labels, ML training data; and
training an ML model with the generated ML training data.

15. One or more computer storage devices having computer-executable instructions stored thereon for automated labeling of child objects within tagged parents, which, on execution by a computer, cause the computer to perform operations comprising:
receiving a plurality of parent objects, each parent object having a tag and each parent object including a plurality of child objects, wherein the parent objects are report documents and the child objects are graphical components of the parent objects;
receiving a machine learning (ML) component operable to rank the plurality of parent objects according to relevance to queries;
for each parent object in the plurality of parent objects:
generating a set of restricted objects from the parent object, wherein each restricted object is generated by generating a copy of the parent object and removing, in turn, each child object in the plurality of child objects from the copy of the parent object and each restricted object corresponds to each removed child object in the plurality of child objects;
for each query of a plurality of queries, ranking, with the ML component, the set of restricted objects according to relevance to the query;
based at least on the query and an inverse of the rank of the set of restricted objects, assigning a child object label, wherein based at least on the query and an inverse of the rank of the set of restricted objects, assigning a child object label comprises:
for the set of restricted objects, identifying a restricted object having a lowest relevance rank;
for the restricted object having the lowest relevance rank, identifying the child object removed from the restricted object having the lowest relevance rank; and
assigning, based at least on the query, a label to the identified child object.

16. The one or more computer storage devices of claim 15, wherein the plurality of queries is based at least on the parent object tags.

17. The one or more computer storage devices of claim 15, wherein the operations further comprise:
selecting, based at least on a search query, a set of parent objects as parent object search results;
selecting, for each parent object search result, based at least on the assigned child object labels and the search query, a corresponding child object; and
presenting, as search result hits, one or more parent object search results paired with the corresponding child objects.

18. The one or more computer storage devices of claim 15, wherein the operations further comprise:
selecting, based at least on the assigned child object labels and a report generation query, a set of child objects relevant to the report generation query, the selected child objects within a common parent object;
ranking the selected child objects according to relevance to the report generation query; and
generating a first custom report, based at least upon a portion of the common parent object, in which the selected child objects are ordered, within the first custom report, based at least on the ranking of the selected child objects.

19. The one or more computer storage devices of claim 15, wherein the operations further comprise:
selecting, based at least on the assigned child object labels and a report generation query, a set of child objects relevant to the report generation query, the selected child objects within a plurality of parent objects;

ranking the selected child objects according to relevance to the report generation query; and generating a second custom report including, based at least upon the ranking of the selected child objects, at least a portion of the selected child objects.

20. The one or more computer storage devices of claim 15, wherein the operations further comprise:

generating, based at least on the assigned child object labels, ML training data; and training an ML model with the generated ML training data.

* * * * *